(12) United States Patent
Stuttaford

(10) Patent No.: US 8,151,574 B2
(45) Date of Patent: Apr. 10, 2012

(54) GAS TURBINE INTEGRATED WITH FUEL CATALYTIC PARTIAL OXIDATION

(75) Inventor: Peter John Stuttaford, Jupiter, FL (US)

(73) Assignee: Alstom Technololgy Ltd (CH)

( * ) Notice: Subject to any disclaimer, the term of this patent is extended or adjusted under 35 U.S.C. 154(b) by 677 days.

(21) Appl. No.: 12/131,252

(22) Filed: Jun. 2, 2008

(65) Prior Publication Data

US 2009/0293444 A1    Dec. 3, 2009

(51) Int. Cl.
*F02C 7/22*    (2006.01)
(52) U.S. Cl. ........ 60/780; 60/39.12; 60/39.182; 60/737; 60/772; 60/777
(58) Field of Classification Search ............ 60/780, 60/39.12, 777, 39.182, 737, 772
See application file for complete search history.

(56) References Cited

U.S. PATENT DOCUMENTS

| | | | |
|---|---|---|---|
| 4,193,259 A | 3/1980 | Muenger | |
| 6,237,343 B1 | 5/2001 | Butler | |
| 6,595,003 B2 * | 7/2003 | Dalla Betta et al. | 60/777 |
| 6,833,013 B1 | 12/2004 | Sanfilippo et al. | |
| 7,395,670 B1 * | 7/2008 | Drnevich et al. | 60/780 |
| 7,634,915 B2 * | 12/2009 | Hoffmann et al. | 60/780 |

OTHER PUBLICATIONS

Peter J. Stuttaford and Khalid Oumejjoud, Low CO2 Combustion System Retrofits for Existing Heavy Duty Gas Turbines, Proceedings of ASME Turbo Expo 2008, Power for Land, Sea and Air, Jun. 2008, Berlin, Germany.
ASME 2008 Turbo Expo: Power for Land, Sea and Air Conference Proceeding Schedule for Jun. 10, 2008 www.asmeconferences.org/TE08//PaperSchedule.cfm.

* cited by examiner

*Primary Examiner* — William H Rodriguez
*Assistant Examiner* — Steven Sutherland
(74) *Attorney, Agent, or Firm* — Shook Hardy & Bacon LLP

(57) ABSTRACT

A system and method for removing at least carbon from a fuel/air mixture prior to injection of the fuel/air mixture into a combustion system is disclosed. The system fully integrates the combined cycle power plant with carbon scrubbing of the fuel/air mixture to increase overall cycle efficiency while capturing carbon from the cycle. A portion of the compressed air source generated by the gas turbine compressor is provided to a premixer where it is mixed with a natural gas to form a fuel/air mixture. The fuel/air mixture passes through a catalytic partial oxidation (CPOX) reactor, which utilizes a precious metal to partially oxidize the hydrocarbons into carbon monoxide. The mixture passes through a shift reactor to complete generation of carbon dioxide and raise hydrogen yield of the fuel/air mixture. Carbon constituents are then removed from the mixture by a separator.

20 Claims, 4 Drawing Sheets

GAS TURBINE INTEGRATED WITH FUEL CATALYTIC PARTIAL OXIDATION

CROSS-REFERENCE TO RELATED APPLICATIONS

Not applicable.

TECHNICAL FIELD

The present invention relates to gas turbine engines. More particularly, embodiments of the present invention relate to a system and method for removing carbon dioxide from a hydrocarbon air mixture.

BACKGROUND OF THE INVENTION

Gas turbine engines operate to produce mechanical work or thrust. Specifically, land-based gas turbine engines typically have a generator coupled thereto for the purposes of generating electricity. A gas turbine engine comprises an inlet that directs air to a compressor section, which has stages of rotating compressor blades. As the air passes through the compressor, the pressure of the air increases. The compressed air is then directed into one or more combustors where fuel is injected into the compressed air and the mixture is ignited. The hot combustion gases are then directed from the combustion section to a turbine section by a transition duct. The hot combustion gases cause the stages of the turbine to rotate, which in turn, causes the compressor to rotate. A byproduct of an untreated combustion process is carbon dioxide ($CO_2$).

Carbon dioxide emissions and associated global warming have become one of the most significant environmental concerns of the $21^{st}$ century. As countries legislate to reduce $CO_2$ emissions, significant opportunities arise to develop clean burning fossil fuel technologies. Also, for operators of gas turbine engines who have taken steps to reduce emissions, it is possible to trade emissions credits to other operators. The growth of carbon trading is beginning to drive a significant source of revenue, estimated to reach US$30B per year in 2007. The power sector is the single largest contributor to $CO_2$ emissions. It is clear that addressing $CO_2$ emissions in the power sector, which burns natural gas, liquid fuel, and coal, will have an impact on global $CO_2$ emissions. While natural gas combined cycle power plants offer one of the cleanest alternatives for burning fossil fuels, this fuel type still significantly contributes to $CO_2$ emissions.

SUMMARY

Embodiments of the present invention are directed towards a system and method for, among other things, removing carbon dioxide from a fuel/air mixture prior to injection of the fuel/air mixture into a combustion system of a gas turbine combined cycle power plant. In one embodiment of the present invention, a gas turbine engine is provided comprising a compressor of the gas turbine, a plenum for receiving an air source from the compressor, and an air collection device capable of diverting a portion of the air source from the plenum. A premixer is in fluid communication with the plenum and mixes fuel with air from the plenum. A catalytic partial oxidation (CPOX) reactor is in fluid communication with the premixer and utilizes a precious metal to partially oxidize the hydrocarbons ($CH_4$) to carbon monoxide (CO). Steam, from the combined cycle of the gas turbine engine, can then be supplied to the fuel/air mixture in a shift reactor, where the steam converts carbon monoxide (CO) to carbon dioxide ($CO_2$), while also increasing the yield of hydrogen in the gas stream. Further, a separator is utilized to remove the carbon dioxide from the fuel/air mixture prior to the fuel/air mixture burning in a combustion section of the gas turbine engine.

In another embodiment, a system capable of reducing carbon dioxide in a fuel/air mixture is provided. The system comprises a premixer, a CPOX reactor, a shift reactor, and a separator where the premixer receives an air supply from an engine compressor and mixes the air supply with natural gas. The CPOX reactor is positioned between the premixer and the shift reactor and utilizes a catalyst, such as a precious metal, for initiating partial oxidation of methane components of the fuel/air mixture into carbon monoxide and hydrogen. The output of the CPOX reactor is directed into the shift reactor, which adds steam to the fuel/air mixture to further process the fuel/air mixture and generate carbon dioxide. The separator then removes the carbon dioxide component of the fuel/air mixture.

In yet another embodiment, a method of removing carbon dioxide from a fuel/air mixture is provided in which a supply of compressed air is directed from a plenum into a premixer where it is mixed with a supply of natural gas to produce a fuel/air mixture. The fuel/air mixture is then directed into a CPOX reactor where the hydrocarbons in the fuel/air mixture are partially-oxidized to form carbon monoxide and hydrogen. The fuel/air mixture is then directed towards a shift reactor where a supply of steam is added to convert the carbon monoxide into carbon dioxide. The fuel/air mixture is then directed into a separator where the carbon dioxide is removed from the fuel/air mixture, resulting in mostly hydrogen and nitrogen components. These components are then directed into a combustion system, where when ignited, hot combustion gases are produced. The resulting emissions produced by the combustion system are reduced compared to burning purely natural gas.

Additional advantages and features of the present invention will be set forth in part in a description which follows, and in part will become apparent to those skilled in the art upon examination of the following, or may be learned from practice of the invention.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Figure 1:
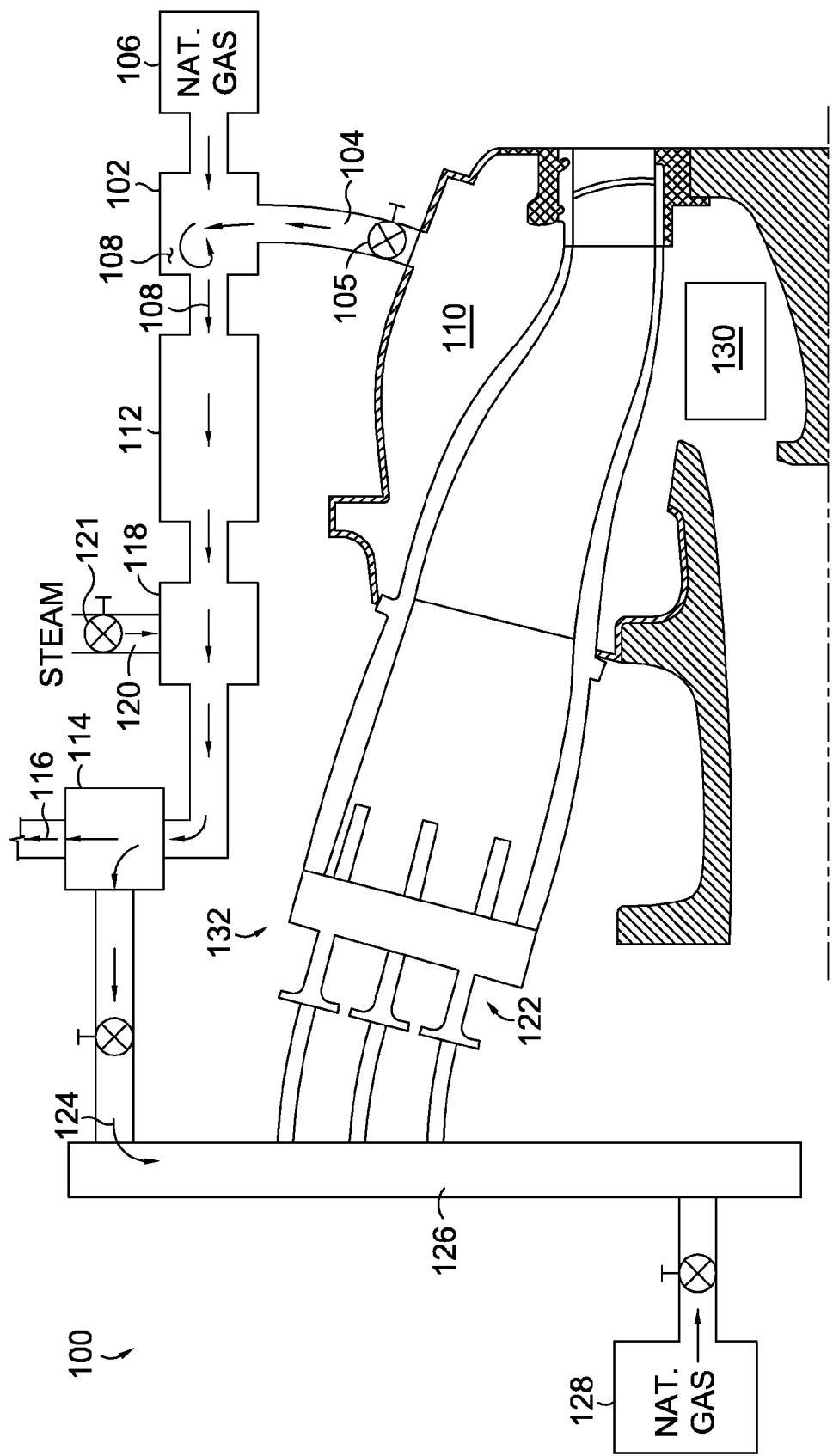
FIG. 1 depicts a schematic view in cross section in accordance with an embodiment of the present invention.

Embodiments of the present invention are depicted in FIGS. 1-4. Referring initially to FIG. 1, a system 100 capable of reducing carbon dioxide in a fuel/air mixture is disclosed in conjunction with a combined cycle gas turbine engine. The system of FIG. 1 displays in an engine pictorial layout with a premixer 102 that receives an air supply 104 that is permitted into the premixer 102 by a variable valve 105. In the premixer 102, the air supply 104 mixes with a supply of natural gas 106 to form an air/fuel mixture 108. The air supply 104 is generated by a compressor (not shown) that is in fluid communication with a compressor plenum 110. The system 100 also comprises a catalytic partial oxidation (CPOX) reactor 112 having a monolith, fixed bed, or fluid bed with a precious metal such as platinum, palladium, or rhodium, or any combination thereof, that is in fluid communication with the premixer 102. As one skilled in the art will understand, a CPOX reactor is a mechanism by which a rich hydrocarbon air mixture is passed over a catalyst, such as one mentioned above, to generate a reaction as follows: $CH_4 + 0.5O_2 \rightarrow CO + 2H_2$. Specifically, the catalyst serves as the mechanism to initiate partial oxidation of the $CH_4$ to CO and $H_2$. Using the CPOX reactor is advantageous because the reaction is very rapid, on the order of milliseconds. In order to properly control the reaction, fuel and air must be supplied at the appropriate temperature, pressure, and mixedness to the CPOX reactor 112. Depending on the required temperatures, the fuel may be pre-heated. The air can be supplied at the appropriate pressure and temperature by utilizing air from the compressor or a compressor of a gas turbine engine.

In fluid communication with the CPOX reactor 112 is a shift reactor 118, which is capable of injecting a steam source 120 into the fuel/air mixture 108 that has passed through the CPOX reactor 112. The steam is supplied from an external source through a variable valve 121. A control system can be used to selectively inject the steam 120 into the shift reactor 118. By adding the steam to the fuel/air mixture 108, an additional transformation occurs where: $CO + H_2O \rightarrow CO_2 + H_2$. If necessary, this step can be optimized by performing the step with higher pressure then lower pressure steam in two shift reactors. The result of such addition of steam is carbon dioxide ($CO_2$), as well as increasing the hydrogen content of the fuel stream by as much as 20%.

The fuel/air mixture then passes into a separator 114, which is capable of removing at least carbon monoxide, depending on whether or not steam 120 is added into the shift reactor 118. If steam 120 has been added, then carbon dioxide 116 is removed from the fuel/air mixture 108. The separator 114 consists of a chemical/physical absorption unit or membrane, or an amine or chilled ammonia based processors. Intermediate heat exchangers can be included as required in order to control required inlet temperatures to each process. The heat exchangers exchange heat with a plant natural gas fuel system or boiler feedwater system, so as to minimize overall efficiency loss. The resultant flow leaving the separator 114 comprises generally nitrogen and hydrogen 124, and is commonly known as a syngas.

The carbon dioxide 116 can then be directed to a capture module (not depicted) consisting of compression and sequestration or solid carbonate formation. There are two fundamental strategies for collecting $CO_2$, with the first being to remove $CO_2$ from the exhaust when the entire exhaust stream is scrubbed, and the second being to remove the carbon at the point of highest concentration, which is in the fuel stream. Removing the carbon from the fuel stream (pre-combustion, as disclosed herein) results in a fuel composition made up mostly of nitrogen and hydrogen.

The system 100 in FIG. 1 further comprises a combustion system 132 having one or more fuel injectors 122 for receiving an output of mostly hydrogen and nitrogen 124 from the separator 114. In the embodiment depicted in FIG. 1, the hydrogen and nitrogen 124 are directed through a fuel manifold 126 to the one or more fuel injectors 122. The resulting hydrogen and nitrogen, also has a lower heating value than natural gas. As a result, a greater volumetric quantity of syngas (hydrogen and nitrogen 124) is required if it is to be used alone, without being combined with a source of natural gas 128. Depending on a variety of factors, such as the combustion system geometry, its operating environment, fuel availability and cost, and required emissions levels, the combustion system 132 may also receive a supply of natural gas 128 to the one or more fuel injectors 122.

Figure 2:
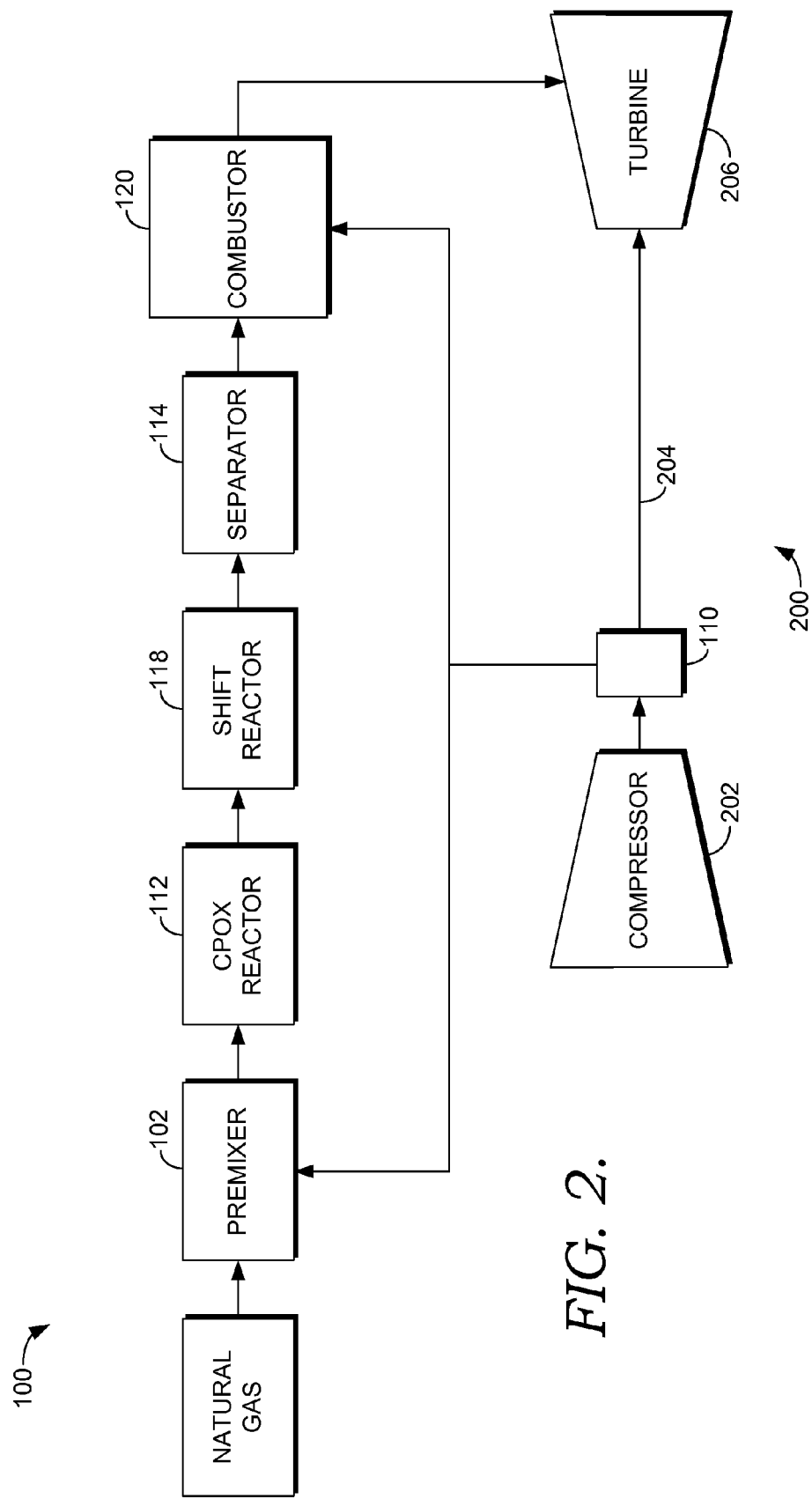
FIG. 2 depicts a layout view of components in accordance with an alternate embodiment of the present invention.

In an alternate embodiment of the present invention, the system 100 described with respect to FIG. 1 is depicted in a similar fashion in a schematic layout in FIG. 2, but includes additional features associated with a gas turbine engine 200, not previously depicted. Although the system 100 can operate separate from the gas turbine engine 200, it can also operate in conjunction with the gas turbine engine 200. FIG. 2 depicts the gas turbine engine 200 having a compressor 202 with the compressor 202 being located generally along an axis 204 of the engine 200. The compressor 202 compresses inlet air to a higher pressure, and as a result, higher temperature than at the entrance of the compressor 202. The compressor 202 feeds the compressed air into the plenum 110 that surrounds the discharge of the compressor. The plenum 110 has an air collection device 130 that is capable of diverting a portion of the compressed air from the plenum 110. The collection device 130, such as a ram scoop, captures the air from the compressor prior to losing pressure associated with the compressor plenum 110. This is important since the economics of the process are most beneficial if the pressure at the ram scoop 130 is adequate to supply the entire cycle without the requirement for an additional compressor. Less than approximately 10% of the total air in the plenum 110 is extracted by the ram scoop 130. Since air is made up of almost 80% nitrogen, this redirection of compressed air has little impact on the overall process, since the air captured by the ram scoop 130 is re-injected into the process by the fuel injectors 122. Use of the ram scoop 130 is only engaged once the engine 300 is operating at or near a baseload, or full power, full load condition, with the air temperature in the plenum 110 above approximately 700 F. This is the minimum temperature required to initiate a reaction in the CPOX reactor 112. The amount of air required is dependent on the fuel equivalence ratio required in the CPOX reactor 112, which should be greater than 3 and less than 10. As previously discussed, a valve 105 is provided at the point of air extraction, adjacent plenum 110, allowing the volume of air for mixing and processing through the CPOX reactor 112 to be actively controlled. Through this system, at least a portion of the natural gas fuel, and possibly all of the natural gas, is treated providing incremental carbon dioxide reductions as might be required by a carbon dioxide treatment plant or other plant economic factors. This system can be installed on a new gas turbine engine or as a flexible low cost retrofit to an existing combined cycle power plant.

Mechanically coupled to the compressor 202 and in fluid communication with the one or more combustion systems 132 is a turbine 206. The compressor 202 is coupled to the turbine 206 through the shaft 204 that runs along a centerline of the engine. The turbine 206 receives the hot combustion gases from the one or more combustion systems 132 and the passing of the hot combustion gases across the blades of the turbine 206 causes the turbine 206 to rotate, and thereby rotates the compressor 202 as well.

The gas turbine engine 200 also comprises a premixer 102 that is in fluid communication with the plenum 110 and is capable of mixing the portion of the air source with a supply of natural gas to form a fuel/air mixture 108. The premixer 102 is designed to have a low pressure drop so as to maintain the fuel/air mixture 108 at as high of a pressure as possible, given the subsequent processes to which the fuel/air mixture 108 will be subjected. The premixer 102 mixes air into the fuel and relies on molecular diffusion processes to ensure mixing with a minimum pressure drop.

In fluid communication with the premixer 102 is a CPOX reactor 112 that comprises a monolith, fixed bed, or fluid bed having a precious metal such as platinum, palladium, rhodium, or any combination thereof. As one skilled in the art understands the monolith, fixed bed, or fluid bed provide an area containing granular solid particles of a catalyst, such as one of the precious metals discussed above. The fuel/air mixture 108 enters the bed at such a velocity so as to cause the solid particles to suspend and act as a fluid to initiate a reaction by the solid particles on the fuel/air mixture 108. The output of the CPOX reactor 112 is directed towards a separator 114, which is capable of removing carbon monoxide constituents from the fuel/air mixture. The carbon constituents are removed by a chemical and/or physical absorption unit or membrane portion of the separator 114. The output of the separator 114 is directed towards one or more combustion systems 132, which are also in fluid communication with the plenum 110. The one or more combustion systems 132 have a plurality of fuel injectors 122 for injecting the remaining fuel constituents.

In operation, the fuel/air mixture 108 is directed from the premixer 102, across a catalyst in the CPOX reactor 112, where a partial oxidation of hydrocarbons to carbon monoxide and hydrogen occurs. Due to the exothermic chemical reaction occurring during the partial oxidation process, a temperature of the fuel/air mixture 108 rises. The temperature of the fuel can be modulated with heat exchangers to the incoming fuel or plant water streams depending on the requirements of the separator 114.

Depending on the gas turbine engine configuration, the engine 200 may further utilize a shift reactor 118, as has been previously discussed, that is positioned between the CPOX reactor 112 and the separator 114. As one skilled in the art will understand, the shift reactor 118 is capable of injecting a steam source 120 into the fuel/air mixture 108 to further oxidize the fuel/air mixture 108 and convert the carbon monoxide into carbon dioxide.

Through the separator 114, the carbon dioxide can then be captured and removed from the fuel/air mixture (as depicted by 116). Depending on the engine configuration, the carbon dioxide can be removed from the system either by safe usage or storage.

Figure 3:
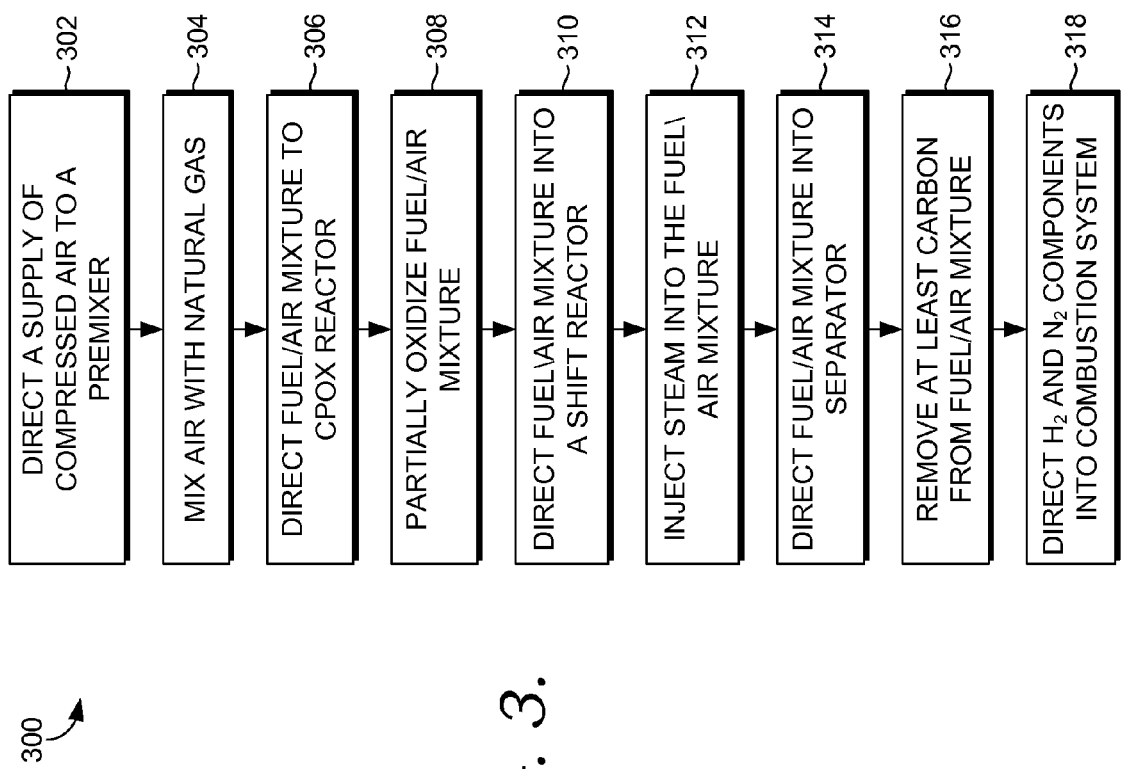
FIG. 3 depicts a flow chart of a process utilizing the embodiment of FIG. 2; and, FIG. 4 depicts a schematic layout of the chemical process undertaken in accordance with an embodiment of the present invention.

Referring now to FIG. 3, a method 300 of removing at least carbon, such as carbon dioxide, from a fuel/air mixture prior to entry of the fuel/air mixture into a combustion system is described. Specifically, in a step 302, a supply of compressed air is directed from a plenum of a compressor and into a premixer. Although the compressed air can be directed into the premixer in a variety of ways, one such way is through a ram scoop device. Then, in a step 304, a supply of natural gas is mixed with the supply of compressed air to produce the fuel/air mixture. The exact ratio of fuel to air will depend on a variety of conditions such as fuel type, combustor configuration, and emissions regulations. This mixing occurs in the premixer, which has a structure that minimizes any drop in pressure associated with the fuel and air mixing process.

In a step 306, the fuel/air mixture is directed to a CPOX reactor, where in a step 308 the hydrocarbons present in the fuel/air mixture undergo a partial-oxidation to form carbon monoxide and hydrogen. The partial-oxidation occurs as a result of the fuel/air mixture being passed across a monolith, fixed bed, or fluid bed having a precious metal such as platinum, palladium, or rhodium. In a step 310, the fuel/air mixture is directed into a shift reactor, where in a step 312, steam is supplied to the mixture to convert the carbon monoxide into carbon dioxide. The addition of steam increases the hydrogen yield and converts the carbon monoxide into carbon dioxide. In a step 314, the mixture is directed into a separator, where in a step 316, at least carbon is removed from the fuel/air mixture. The output of this separating process is mostly hydrogen and nitrogen components. In a step 318, the mostly hydrogen and nitrogen components are directed into a combustion system.

Figure 4:
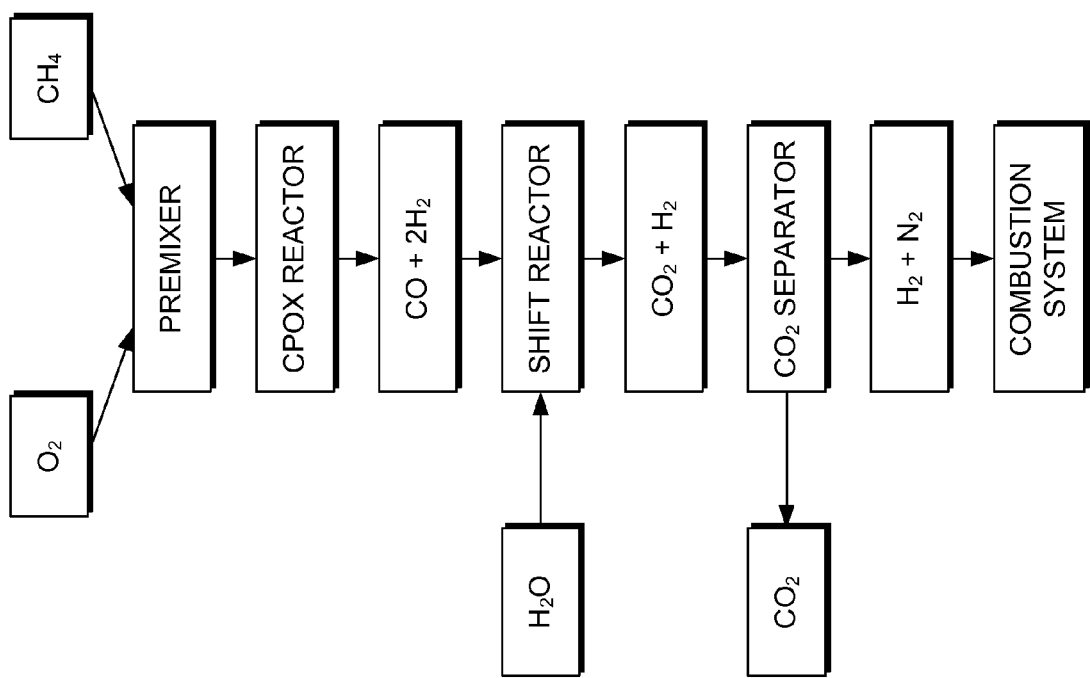

The process under which the fuel and air are mixed and oxidized is depicted in FIG. 4. The fuel ($CH_4$) and air ($O_2$) are injected to a premixer. The fuel/air mixture then passes to the CPOX reactor, which partially oxidizes the mixture into carbon monoxide and hydrogen. When a shift reactor is employed, steam ($H_2O$) is added to the mixture in the shift reactor. The output of the shift reactor is carbon monoxide and hydrogen. In the separator at least carbon, and when steam has been added, $CO_2$, is removed from the mixture such that the remaining products ($H_2$, and $N_2$ as well as any small quantities of $CH_4$, $CO_2$, and CO) are directed to the combustion system.

Although shown depicted in conjunction with a single axial compressor in FIG. 2, it is to be understood that the present invention could utilize multiple compressors or compressors having different orientations other than along an engine axis. The gas turbine engine also comprises one or more combustion systems that are in fluid communication with the compressor. For the embodiment depicted in FIG. 2, it is intended that the gas turbine engine 200 utilizes a plurality of can-annular combustion systems. However, the invention is not limited to this combustor arrangement and can include a variety of combustor types (i.e. diffusion, premix, or combination) that operate on a variety of fuel types (i.e. liquid, gaseous, or both).

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A gas turbine engine comprising:
    a compressor;
    a plenum that receives a source of air from the compressor, the plenum having an air collection device capable of diverting a portion of the air source from the plenum;
    a premixer in fluid communication with the plenum and capable of mixing the portion of the air source with a supply of natural gas to form a fuel/air mixture, wherein mixing is performed via a molecular diffusion process to ensure a minimum pressure drop;

a catalytic partial oxidation (CPOX) reactor in fluid communication with the premixer;

a shift reactor in fluid communication with the CPOX reactor, wherein the shift reactor is capable of selectively injecting steam from an external steam source into the fuel/air mixture via a steam inlet, wherein the steam inlet selectively injects the steam using a variable valve within the steam inlet that is controlled by a control system;

a separator capable of removing carbon dioxide from the fuel/air mixture; and one or more combustion systems in fluid communication with the plenum and the separator, the one or more combustion systems having a plurality of fuel injectors, wherein the fuel/air mixture is directed from the premixer to a catalyst in the CPOX reactor that initiates a partial oxidation of hydrocarbons to carbon monoxide and hydrogen, and wherein the carbon monoxide and hydrogen are then directed to the shift reactor that injects the steam for converting the carbon monoxide into carbon dioxide.

2. The gas turbine engine of claim 1, wherein the air source is supplied to the plenum by the compressor.

3. The gas turbine engine of claim 2, wherein a variable valve is located between the plenum and the premixer for adjusting the portion of the air source drawn from the plenum.

4. The gas turbine engine of claim 1, wherein the premixer has a low pressure drop.

5. The gas turbine engine of claim 1, wherein the supply of natural gas is metered between 0% and 100% of a total fuel supply to the one or more combustion systems, as determined by availability and requirements of a carbon storage process.

6. The gas turbine engine of claim 1, wherein the carbon dioxide is removed prior to a hydrogen/nitrogen mixture being directed to the plurality of fuel injectors.

7. The gas turbine engine of claim 1, wherein a hydrogen level of the hydrogen/nitrogen mixture is increased by the shift reactor.

8. The gas turbine engine of claim 1, wherein the CPOX reactor comprises a monolith, fixed bed, or fluid bed having a precious metal such as platinum, palladium, or rhodium, or any combination thereof.

9. The gas turbine engine of claim 1, wherein a temperature of the fuel/air mixture rises during the partial oxidation of the fuel/air mixture.

10. The gas turbine engine of claim 1, wherein the carbon dioxide is removed by a chemical and/or physical absorption unit or membrane of the separator.

11. A method of removing carbon dioxide from a fuel/air mixture prior to entry of the fuel/air mixture into a combustion system, the method comprising:

directing a supply of compressed air from a plenum into a premixer;

mixing a supply of natural gas with the supply of compressed air to produce the fuel/air mixture;

directing the fuel/air mixture into a catalytic partial oxidation (CPOX) reactor;

partially-oxidizing hydrocarbons in the fuel/air mixture to form carbon monoxide and hydrogen;

mixing the fuel/air mixture with a supply of steam in a shift reactor, wherein the shift reactor mixes via a first step that selectively injects high-pressure steam and a second step that selectively injects low-pressure steam;

directing the fuel/air mixture into a separator;

removing at least carbon dioxide from the fuel/air mixture, resulting in mostly hydrogen and nitrogen components; and directing the mostly hydrogen and nitrogen components into a combustion system.

12. The method of claim 11, wherein the supply of compressed air is directed into the plenum by a ram scoop.

13. The method of claim 11, wherein the natural gas is mixed with the compressed air in a low pressure drop premixer, external to the plenum.

14. The method of claim 13, wherein the mixing with steam increases hydrogen yield and converts the carbon monoxide into carbon dioxide.

15. The method of claim 11, wherein the CPOX reactor comprises a monolith, fixed bed, or fluid bed and having a precious metal such as platinum, palladium, or rhodium.

16. A system capable of removing carbon dioxide from a fuel/air mixture comprising:

a plenum that receives a supply of air from a compressor, the plenum having an air collection device capable of diverting a portion of the air supply from the plenum, wherein the air collection device includes a ram scoop that captures the portion of the air supply at a pressure generated by the compressor, wherein the pressure is adequate to move the portion of the air supply through the system without an additional compressor;

a premixer for receiving the variable air supply from the engine compressor and injecting natural gas into the air supply to form the fuel/air mixture;

a catalytic partial oxidation (CPOX) reactor in fluid communication with the premixer;

a shift reactor having a steam inlet through which steam may be injected into the mixture, where the steam converts the carbon monoxide into carbon dioxide; and, a separator capable of removing at least carbon from the fuel/air mixture;

wherein a catalyst in the CPOX reactor initiates a partial oxidation of methane components of the fuel/air mixture into carbon monoxide and hydrogen.

17. The system of claim 16, wherein the premixer receives the air source from a compressor plenum.

18. The system of claim 16, wherein the CPOX reactor comprises a monolith, fixed bed, or fluid bed having a precious metal such as platinum, palladium, or rhodium, or a combination thereof.

19. The system of claim 16, further comprising a combustion system having one or more fuel injectors for receiving an output of mostly hydrogen and nitrogen from the separator.

20. The system of claim 19, wherein the combustion system also receives a supply of natural gas to the one or more fuel injectors.

* * * * *